US011962426B2

(12) United States Patent
Peng et al.

(10) Patent No.: US 11,962,426 B2
(45) Date of Patent: Apr. 16, 2024

(54) ETHERNET POWER SUPPLY

(71) Applicant: DELTA ELECTRONICS, INC., Taoyuan (TW)

(72) Inventors: Yung-Wei Peng, Taoyuan (TW); Kuan-Hsien Tu, Taoyuan (TW); Cheng-En Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 197 days.

(21) Appl. No.: 17/824,512

(22) Filed: May 25, 2022

(65) Prior Publication Data
US 2023/0179436 A1 Jun. 8, 2023

(30) Foreign Application Priority Data
Dec. 8, 2021 (CN) .......................... 202123068906.1

(51) Int. Cl.
*H04L 12/10* (2006.01)
(52) U.S. Cl.
CPC .................................... *H04L 12/10* (2013.01)

(58) Field of Classification Search
CPC ................................ H04L 12/10; Y02D 30/50
See application file for complete search history.

(56) References Cited

U.S. PATENT DOCUMENTS

| | | | |
|---|---|---|---|
| 2016/0282922 A1* | 9/2016 | Petrovic | ................. G06F 1/266 |
| 2020/0195451 A1* | 6/2020 | Chen | ..................... G06F 1/3209 |
| 2021/0006419 A1* | 1/2021 | Nieh | ...................... H02M 1/088 |

\* cited by examiner

*Primary Examiner* — Jaweed A Abbaszadeh
*Assistant Examiner* — Brian J Corcoran
(74) *Attorney, Agent, or Firm* — MUNCY, GEISSLER, OLDS & LOWE, P.C.

(57) ABSTRACT

An Ethernet power supply receives a DC voltage through a bus positive terminal and a bus negative terminal, and is coupled to a load device. The Ethernet power supply includes a first control module and a second control module. The first control module is used to provide a first control signal through the bus negative terminal to confirm whether the load device is a valid load. The second control module is used to connect or disconnect a coupling relationship between the bus positive terminal and the first control module according to the load device being connected or not.

14 Claims, 7 Drawing Sheets

ETHERNET POWER SUPPLY

BACKGROUND

Technical Field

The present disclosure relates to an Ethernet power supply, and more particularly to an Ethernet power supply with a power saving function.

Description of Related Art

The statements in this section merely provide background information related to the present disclosure and do not necessarily constitute prior art.

Since most of the power source equipment (PSE) currently on the market are communicated with the power devices (PD) (i.e., the loads) by using the full-time handshaking signals to determine whether the PSE should supply power to the correct (matched) PD, even if the PD is not connected, the PSE will continuously send handshaking signals for detection, resulting in power loss. Therefore, the current Ethernet power supply cannot meet the requirements of the current efficiency energy regulations (for example, DoE, EC CoC, etc.), and the schematic diagram of the circuit structure is shown in FIG. 1 below.

When this circuit design realizes full-time handshaking signal communication, even if the PD has been removed (disconnected), the controller of the power supply will continuously send handshaking signals so that no-load power consumption cannot meet the requirements under the current efficiency energy regulations (for example, DoE, EC CoC, etc.).

Accordingly, when the load equipment has not been connected to an Ethernet power supply, it is desired that the controller of the Ethernet power supply can be powered off to be in a state of stop working.

SUMMARY

In order to solve the above-mentioned problems, the present disclosure provides an Ethernet power supply. The Ethernet power supply receives a DC voltage, and is coupled to a load device. The Ethernet power supply includes a first control module and a second control module. The first control module receives the DC voltage through a bus positive terminal and a bus negative terminal, and is coupled to a negative end of the load device through the bus negative terminal so as to provide a first control signal through the bus negative terminal to confirm whether the load device is a valid load, and a second control signal is provided from a communication terminal to ground the bus negative terminal after the load device is confirmed as the valid load. The second control module is coupled to a power terminal of the first control module and the bus positive terminal. The second control module includes a switch unit, a first control unit, and a second control unit. The switch unit is coupled to the bus positive terminal and the power terminal, and connects or disconnects a coupling relationship between the power terminal and the bus positive terminal according to the load device being connected or not. The first control unit is coupled to the bus negative terminal and the switch unit, and turns on or turns off the switch unit according to a terminal voltage of the bus negative terminal. The second control unit is coupled to the communication terminal and the switch unit, and turns on or turns off the switch unit according to the second control signal.

In order to solve the above-mentioned problems, the present disclosure provides an Ethernet power supply. The Ethernet power supply receives a DC voltage, and is coupled to a load device. The Ethernet power supply includes a first control module and a second control module. The first control module receives the DC voltage through a bus positive terminal and a bus negative terminal, and is coupled to a negative end of the load device through the bus negative terminal so as to provide a first control signal through the bus negative terminal to confirm whether the load device is a valid load, and a second control signal is provided from a communication terminal to ground the bus negative terminal after the load device is confirmed as the valid load. The second control module is coupled to a power terminal of the first control module and the bus positive terminal. The second control module includes a switch unit, a trigger component, and an unlock circuit. The switch unit is coupled to the bus positive terminal and the power terminal, and provides a lock-on state to connect a coupling relationship between the power terminal and the bus positive terminal according to the load device being connected, and provides an unlock-off state to disconnect the coupling relationship between the bus positive terminal and the power terminal according to the load device being disconnected. The trigger component is coupled to the bus negative terminal and the switch unit, and triggers the switch unit to be the lock-on state according to the increase of a terminal voltage of the bus negative terminal. The unlock circuit is coupled to the communication terminal and the switch unit, and builds an unlock voltage according to the second control signal, and controls the switch unit to be the unlock-off state through the unlock voltage when the negative end of the load device is disconnected from the bus negative terminal.

The main purpose and effect of the present disclosure is that the Ethernet power supply detects whether the load device is connected to determine whether to operate the first control module. When the load device is not connected to the Ethernet power supply, the second control module controls the first control module to be powered off and stop working so as to save the power consumption of the Ethernet power supply and comply with the energy efficiency regulations.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
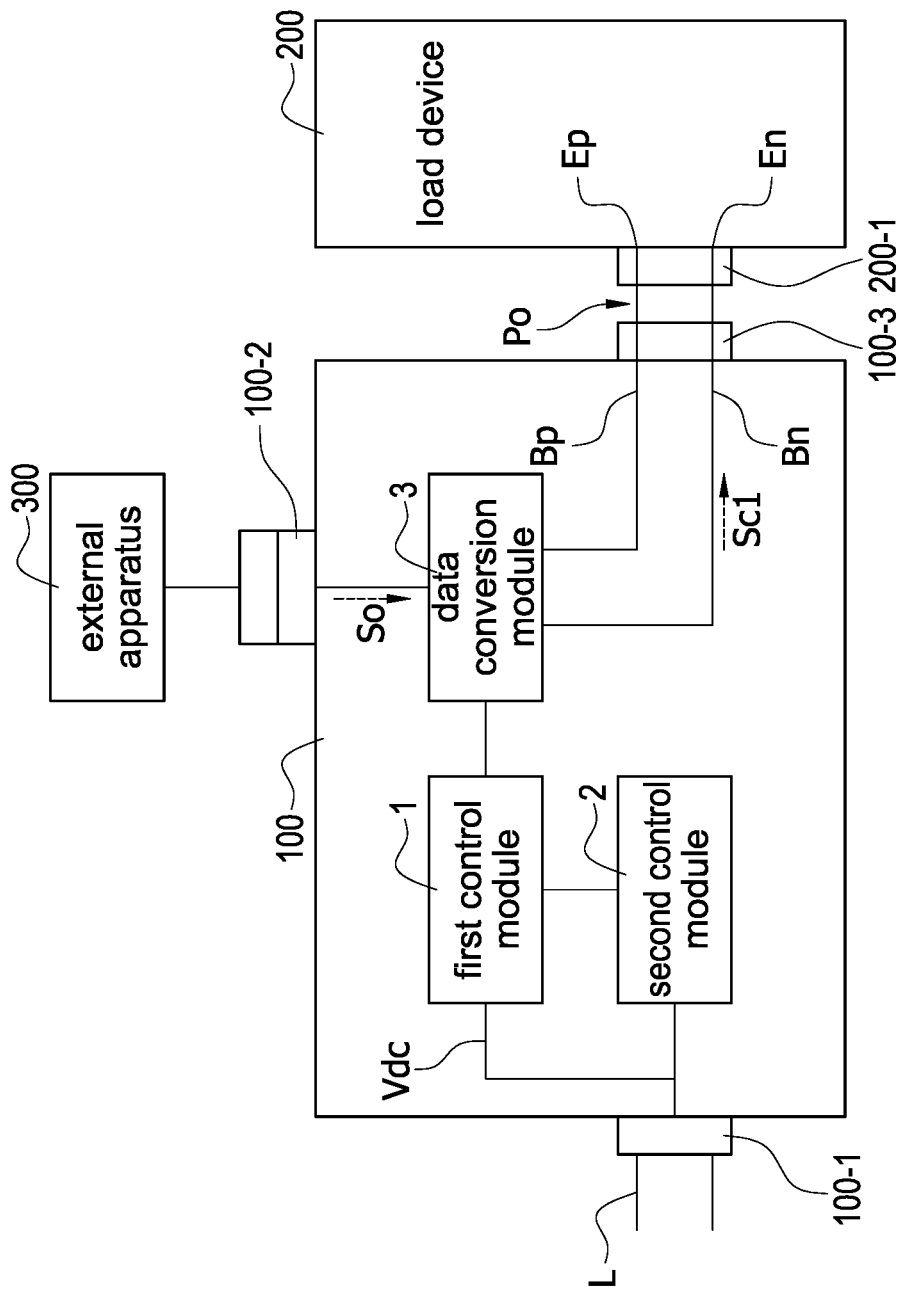
FIG. 1 is a block diagram of an Ethernet power supply with a power saving function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of an Ethernet power supply with a power saving function according to the present disclosure. The Ethernet power supply 100 is used to provide a DC voltage Vdc to a load device 200 for supplying power to the load device 200. In particular, the DC voltage Vdc, for example, but not limited to, may be 20 volts to 55 volts, depending on the specifications of the Ethernet power supply 100. The Ethernet power supply 100 includes a first control module 1, a second control module 2, and a data conversion module 3. The first control module 1 is coupled to the second control module 2 and the data conversion module 3. The first control module 1 is coupled to a power wire L through a first port 100-1, and the first control module 1 operates to provide a first control signal Sc1 by receiving the DC voltage Vdc provided from the power wire L through the bus positive terminal Bp and the bus negative terminal Bn. The data conversion module 3 is coupled to an external apparatus 300 through a second port 100-2 to receive an external signal So provided by the external apparatus 300 and receive a first control signal Sc1 and the DC voltage Vdc provided by the first control module 1. In particular, the external apparatus 300 is, for example, but not limited to, a web camera, or a central server.

The data conversion module 3 is coupled to the load device 200 through a third port 100-3, and the data conversion module 3 is used to integrate the DC voltage Vdc, the first control signal Sc1, and the external signal So into an integrated output power Po including the voltage, the current, and the signal, and provides the integrated output power Po to the load device 200 to an equipment interface 200-1 through the third port 100-3. The data conversion module 3 includes a conversion unit (not shown) of processing (converting) signals and voltages for converting the voltage or the signal into a voltage or a signal that meets the requirements of the load device 200 as well as integrating the DC voltage Vdc, the first control signal Sc1, and the external signal So into the integrated output power Po. The third port 100-3 is coupled to the bus positive terminal Bp and the bus negative terminal Bn and provides the DC voltage Vdc to a positive end Ep and a negative end En of the equipment interface 200-1 through the bus positive terminal Bp and the bus negative terminal Bn. The bus negative terminal Bn is used to provide the first control signal Sc1 to the negative end En of the equipment interface 200-1.

Specifically, the main purpose and effect of the present disclosure is that the Ethernet power supply 100 detects whether the load device 200 is connected to determine whether to operate the first control module 1. When the load device 200 is not connected to the Ethernet power supply 100, the second control module 2 controls the first control module 1 to be powered off and stop working so as to save the power consumption of the Ethernet power supply 100 and comply with the energy efficiency regulations (for example, DoE, EC CoC, MEPS, Tier, etc.) When the load device 200 is connected (inserted) to the Ethernet power supply 100, the second control module 2 controls the first control module 1 operating so that the first control module 1 provides the first control signal Sc1 to confirm whether the load device 200 is a valid load or not, and therefore the Ethernet power supply 100 determines whether the load device 200 should continuously be supplied the power required. If the load device 200 is not confirmed as the valid load, the Ethernet power supply 100 supplies the implied power to the load device 200, for example, but not limited to, 0.44 watts to 12.95 watts. On the contrary, if the load device 200 is confirmed as the valid load, the Ethernet power supply 100 continuously supplies power to the load device 200, for example, but not limited to, 0.44 watts to 3.84 watts, or 3.84 watts to 6.49 watts, etc., depending on the demand of the load device 200.

Take the 36 watts of EC CoC v5 Tier 2 regulations as an example, and the no-load loss of the Ethernet power supply 100 is limited to less than or equal to 75 mW (milliwatts). It is assumed that the loss of the Ethernet power supply 100 under the no-load condition is 65 mW, and the loss of operating the first control module 1 is 200 mW. When the Ethernet power supply 100 with no power saving function is in the no-load condition, the (no-load) loss is 65 mW+200 mW=265 mW, which is not less than or equal to 75 mW, i.e., the no-load loss does not meet the energy standard. However, for the Ethernet power supply 100 with the power saving function of the present disclosure under the no-load condition, since the second control module 2 can turn off the first control module 1, the no-load loss is only 65 mW, which meets the energy standard.

Figure 2:
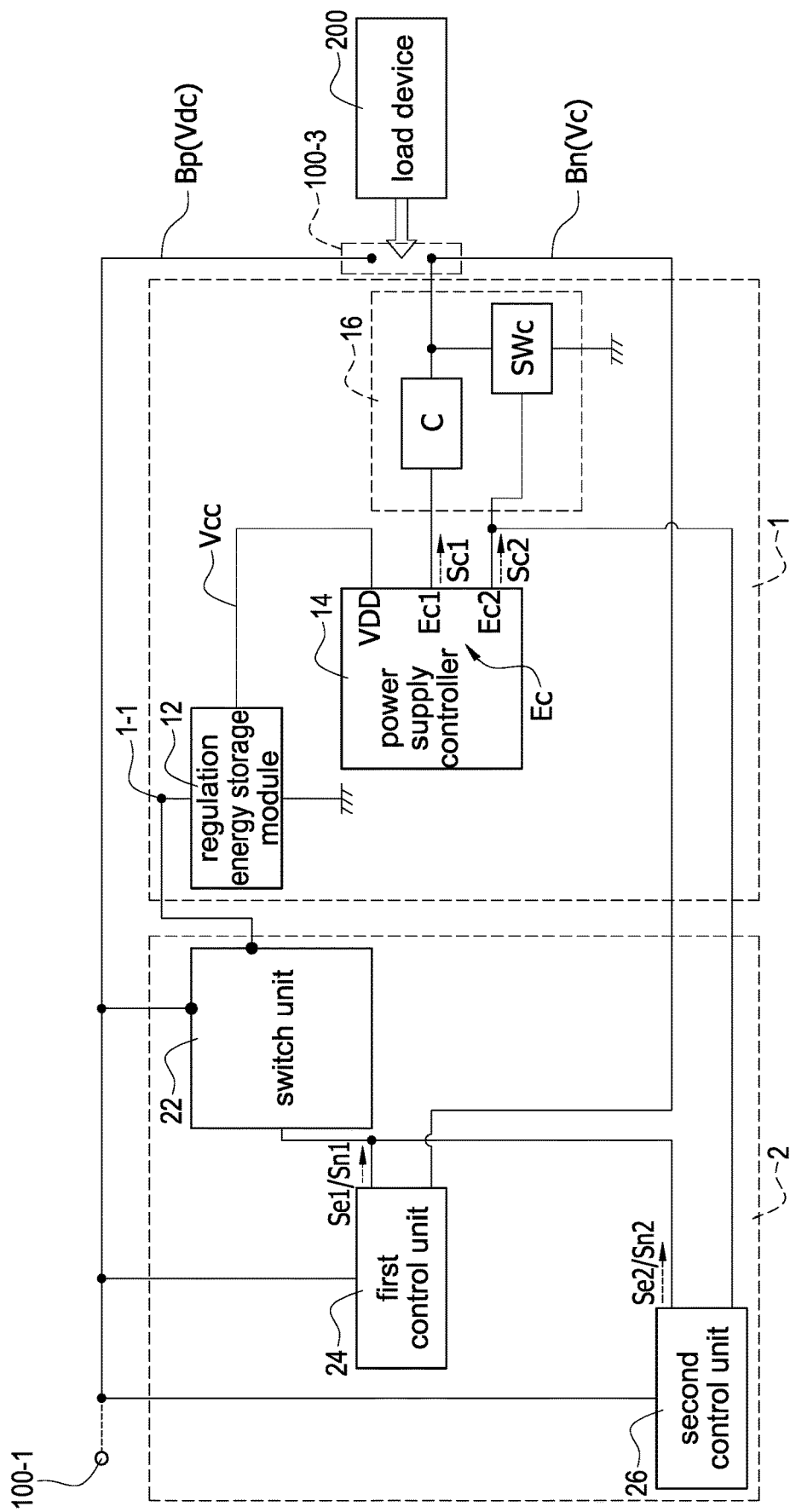
FIG. 2 is a detailed block diagram of the Ethernet power supply with the power saving function according to a first embodiment of the present disclosure.

Please refer to FIG. 2, which shows a detailed block diagram of the Ethernet power supply with the power saving function according to a first embodiment of the present disclosure, and also refer to FIG. 1. The first control module 1 includes a regulation energy storage module 12, a power supply controller 14, and a communication module 16. The regulation energy storage module 12 is coupled to the second control module 2 through a power terminal 1-1. The regulation energy storage module 12 is, for example, but not limited to, a voltage regulation circuit, an energy storage component, a converter, and other components or circuits that have functions of voltage regulation, energy storage, or power conversion. A power pin VDD of the power supply controller 14 is coupled to the regulation energy storage module 12, and a communication terminal Ec is coupled to the second control module 2. The communication terminal Ec has two pins Ec1, Ec2, i.e., a first pin Ec1 and a second pin Ec2. A first end of the communication module 16 is coupled to the first pin Ec1 and the second pin Ec2 of the communication terminal Ec, and a second end of the communication module 16 is coupled to the bus negative terminal Bn. When the power supply controller 14 operates (in a working status), the first pin Ec1 provides the first control signal Sc1 and the second pin Ec2 provides the second control signal Sc2 to perform corresponding controls. The regulation energy storage module 12 is used to store the DC voltage Vdc as a power supply voltage Vcc which is stable for providing the required power to the power supply controller 14 to be powered on and worked. In particular, if the power supply controller 14 may directly use the DC voltage Vdc to work, the regulation energy storage module 12 can also be omitted.

The second control module 2 includes a switch unit 22, a first control unit 24, and a second control unit 26. A first end of the switch unit 22 is coupled to the power terminal 1-1, and a second end of the switch unit 22 is coupled to the bus positive terminal Bp. The path from the first port 100-1 to the bus positive terminal Bp may include several devices or components (see FIG. 1), which is represented by dashed lines. The first control unit 24 is coupled to the bus negative terminal Bn and a control end of the switch unit 22, and the second control unit 26 is coupled to the second pin Ec2 of the communication terminal Ec of the power supply controller 14 and the control end of the switch unit 22. The bus positive terminal Bp and the bus negative terminal Bn are coupled to the load device 200 through the third port 100-3. The switch unit 22 is used to connect or disconnect the coupling relationship between the power terminal 1-1 and the bus positive terminal Bp according to the load device 200 being connected (inserted) or not. When the load device 200 is connected to the Ethernet power supply 100, the coupling relationship between the power terminal 1-1 and the bus positive terminal Bp is connected so that the first control module 1 is powered on to work. The first control unit 24 and the second control unit 26 are used to control turning on or turning off the switch unit 22 according to a signal provided by the first control module 1. Therefore, when the load device 200 is disconnected from the Ethernet power supply 100, the coupling relationship between the power terminal 1-1 and the bus positive terminal Bp is disconnected so that the first control module 1 is powered off to rest (stop working).

Specifically, when the load device 200 is not connected to (disconnected from) the Ethernet power supply 100, the first control unit 24 and the second control unit 26 disconnect the coupling relationship between the power terminal 1-1 and the bus positive terminal Bp so that the first control module 1 is powered off to rest and does not provide the first control signal Sc1. When the load device 200 is connected to the Ethernet power supply 100, a temporary loop is formed between the Ethernet power supply 100 and the load device 200 through the first port 100-1, the bus positive terminal Bp, the load device 200, and the bus negative terminal Bn so that a terminal voltage Vc of the bus negative terminal Bn is increased. Due the increase of the terminal voltage Vc, the first control unit 24 provides a first valid control signal Se1 to the switch unit 22 according to the temporary state of connecting the load device 200 to the Ethernet power supply 100. In this condition, since the power supply controller 14 is still powered off to rest, the second control unit 26 provides a second invalid control signal Sn2 to the switch unit 22. The switch unit 22 is turned on through the first valid control signal Se1 so that the power terminal 1-1 and the bus positive terminal Bp is electrically coupled (indicated by dashed lines). The power supply controller 14 receives the power supply voltage Vcc (or the DC voltage Vdc) to be powered on to work, and therefore the power supply controller 14 starts to provide the first control signal Sc1 to communicate with the load device 200, thereby determining whether the load device 200 is a valid (available) load.

Incidentally, the first control signal Sc1 may be a signal with a handshaking mechanism or a signal without a handshaking mechanism. If there is no handshaking mechanism, the first control signal Sc1 may be a detection signal for detecting specific parameters of the load device 200, and the detection result is used to determine whether the load device 200 is a valid (available) load. In one embodiment, take the first control signal Sc1 as a signal with a handshake mechanism as an example, the control method will be described in detail below. The signal that does not have a handshaking mechanism may be equivalently inferred for its control method, and the detail description is omitted here for conciseness.

When the power supply controller 14 is successfully communicated with the load device 200 through the first control signal Sc1 and confirms that the load device 200 is the valid load, it means that the communication between the power supply controller 14 and the load device 200 is completed, and therefore the power supply controller 14 ends (stops) providing the first control signal Sc1. In this condition, the power supply controller 14 provides, for example, but not limited to, a second control signal Sc2 with a first potential to the communication module 16 (where the first potential may be a high potential) to control the communication module 16 grounding the bus negative terminal Bn. At the same time, the second control signal Sc2 is also provided to the second control unit 26. When the bus negative terminal Bn is grounded, the DC voltage Vdc may be provided to the load device 200 through the bus positive terminal Bp and the bus negative terminal Bn to supply the power required by the load device 200. In this condition, since the bus negative terminal Bn is grounded, the first control unit 24 provides a first invalid control signal Sn1 to the switch unit 22. The second control unit 26 provides a second valid control signal Se2 to the switch unit 22 according to the second control signal Sc2 provided by the second pin Ec2. Therefore, the switch unit 22 is continuously turned on through the second valid control signal Se2.

When the power supply controller 14 is unsuccessfully communicated with the load device 200 through the first control signal Sc1 and determines that the load device 200 is the invalid (unavailable) load, it means that the load device 200 does not comply with the specific specifications of Ethernet power supply (for example, but not limited to, the IEEE 802.3 protocol standards which define the physical layer and MAC sublayer of the data link layer of wired Ethernet). In this condition, the power supply controller 14 still ends (stops) providing the first control signal Sc1, and the power supply controller 14 provides the second control signal Sc2 with the first potential to the communication module 16 to control the communication module 16 grounding the bus negative terminal Bn. Also, the switch unit 22 is still continuously turned on by the second control module 2. However, the power supply controller 14 controls the Ethernet power supply 100 to provide the implied power to the load device 200 instead of the power required by the load device 200.

When the load device 200 is disconnected from the Ethernet power supply 100, the terminal voltage Vc of the bus negative terminal Bn will change to, for example, but not limited to, a high potential (but it may also be a low potential, which may be determined according to the actual design of the circuit). The power supply controller 14 provides the second control signal Sc2 with the second potential (where the second potential may be a low potential) to the communication module 16 according to the terminal voltage Vc of the bus negative terminal Bn changing to the high potential. The second control signal Sc2 with the second potential controls the communication module 16 to restore the bus negative terminal Bn to a state of not being connected (inserted) to the load device 200. In this condition, the first control unit 24 provides the first invalid control signal Sn1 to the switch unit 22 according to the terminal voltage Vc of the bus negative terminal Bn changing to the high potential. The second control unit 26 provides the second invalid control signal Sn2 to the switch unit 22 according to the second control signal Sc2. The switch unit 22 is turned off through the first invalid control signal Sn1 and the second invalid control signal Sn2.

As shown in FIG. 2, the communication module 16 may be formed (constituted) by, for example, but not limited to, a switch SWc. A first end of the switch SWc is coupled to the first pin Ec1 (through a capacitor C) and the bus negative terminal Bn, a second end of the switch SWc is grounded, and a control end of the switch SWc is coupled to the second pin Ec2. The power supply controller 14 provides the first control signal Sc1 to the bus negative terminal Bn through the first pin Ec1 so as to communicate with the load device 200. After the communication, the power supply controller 14 stops providing the first control signal Sc1, and the power supply controller 14 provides the second control signal Sc2 with the first potential to turn on the switch SWc through the second pin Ec2 of the communication terminal Ec so as to ground the bus negative terminal Bn through the switch SWc. In this condition, the single potential is sufficient to turn on the switch SWc. When the second pin Ec2 provides the second control signal Sc2 with the second potential, the second control signal Sc2 with the second potential turns off the switch SWc so as to restore the bus negative terminal Bn to a state of not being connected (inserted) to the load device 200.

Figure 3A:
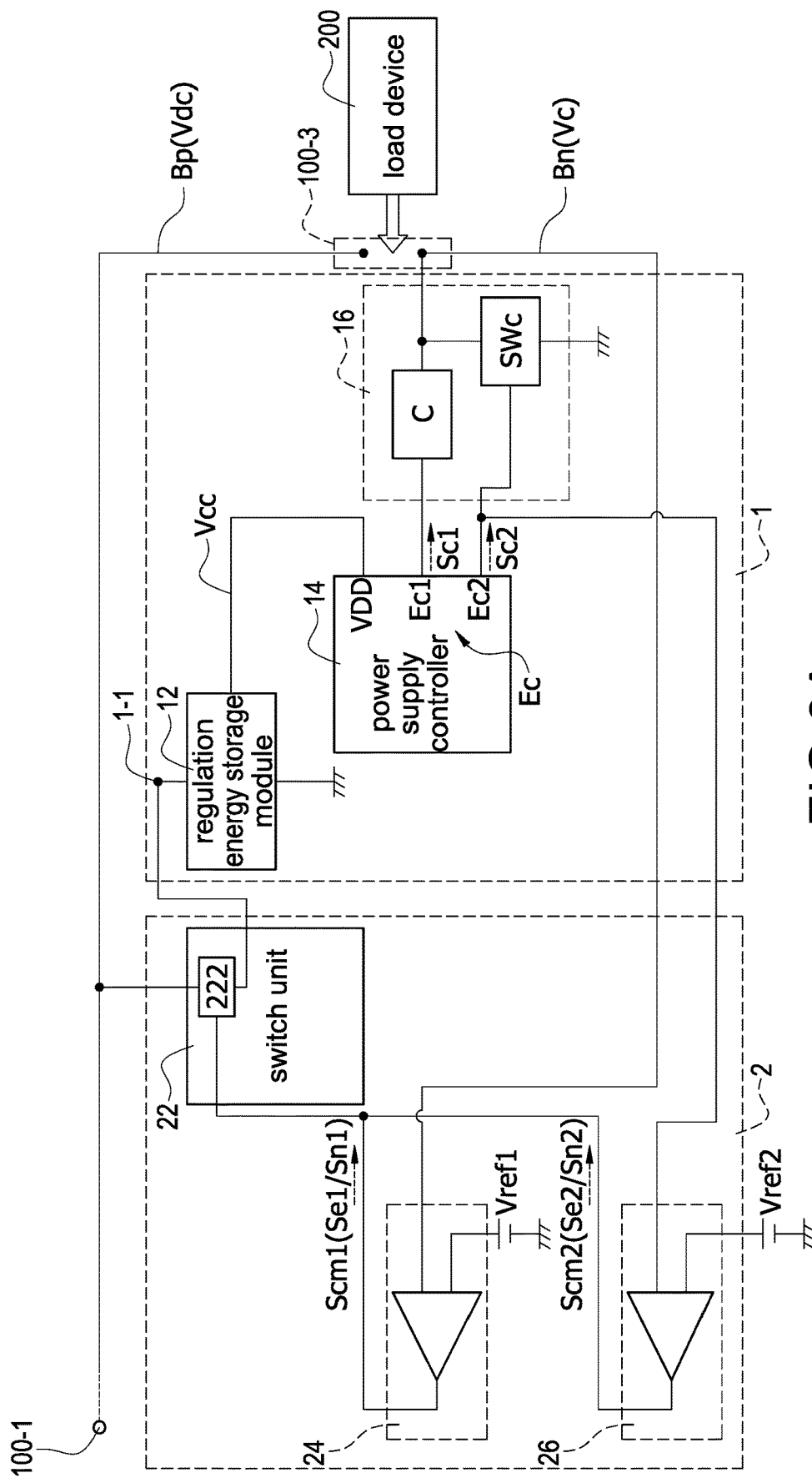
FIG. 3A is a block diagram of a first embodiment of a second control module of the Ethernet power supply according to the first embodiment of the present disclosure.
Figure 3B:
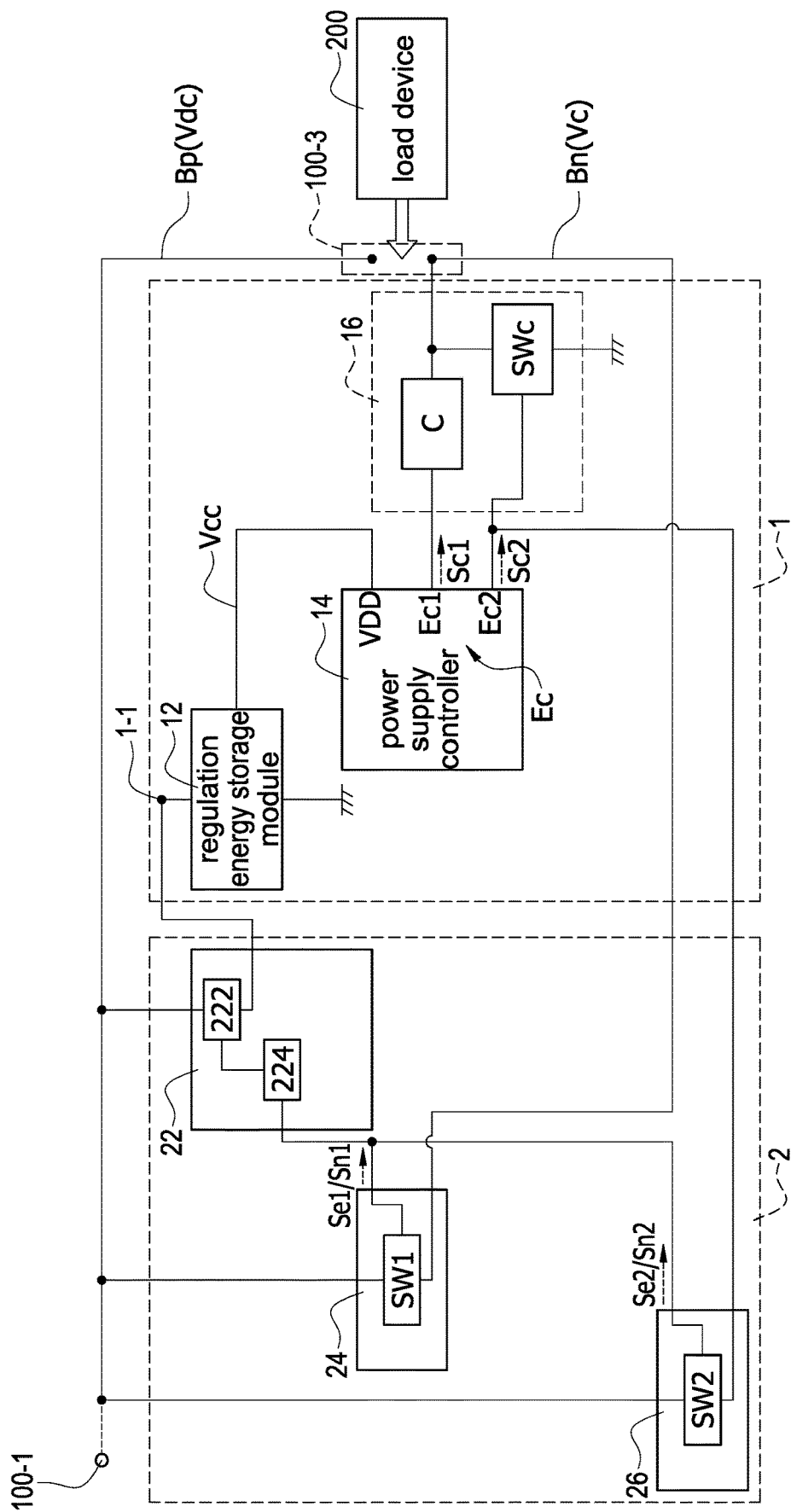
FIG. 3B is a block diagram of a second embodiment of the second control module of the Ethernet power supply according to the first embodiment of the present disclosure.

Please refer to FIG. 3A, which shows a block diagram of a first embodiment of a second control module of the Ethernet power supply according to the first embodiment of the present disclosure, FIG. 3B, which shows a block diagram of a second embodiment of the second control module of the Ethernet power supply according to the first embodiment of the present disclosure, and also refer to FIG. 1 and FIG. 2. As shown in FIG. 3A, the first control unit 24 may be a first comparator and the second control unit 26 may be a second comparator. A first end of the first comparator is coupled to the bus negative terminal Bn, a second end of the first comparator is coupled to a first reference voltage Vref1, and an output end of the first comparator is coupled to the switch unit 22. The first comparator is used to compare the terminal voltage Vc with the first reference voltage Vref1, and according to the comparison result, the output end of the first comparator provides a first comparison signal Scm1 (i.e., the first valid control signal Se1 or the first invalid control signal Sn1 shown in FIG. 2) to the switch unit 22 so that the switch unit 22 is controlled by the first comparison signal Scm1. Similarly, a first end of the second comparator is coupled to the second pin Ec2, a second end of the second comparator is coupled to a second reference voltage Vref2, and an output end of the second comparator is coupled to the switch unit 22. The second comparator is used to compare the second control signal Sc2 with the second reference voltage Vref2, and according to the comparison result, the output end of the second comparator provides a second comparison signal Scm2 (i.e., the second valid control signal Se2 or the second invalid control signal Sn2 shown in FIG. 2) to the switch unit 22 so that the switch unit 22 is controlled by the second comparison signal Scm2.

In one embodiment, when the terminal voltage Vc is higher than the first reference voltage Vref1, the first comparison signal Scm1 provided from the first comparator is the first valid control signal Se1. On the contrary, the first comparison signal Scm1 is the first invalid control signal Sn1. When the second control signal Sc2 is higher than the second reference voltage Vref2, the second comparison signal Scm2 provided from the second comparator is the second valid control signal Se2. On the contrary, the second comparison signal Scm2 is the second invalid control signal Sn2. In one embodiment, the voltage comparison of the first comparator and that of the second comparator may be opposite to the above-mentioned embodiment. That is, when the terminal voltage Vc is lower than the first reference voltage Vref1, the first comparison signal Scm1 provided from the first comparator is the first valid control signal Se1, or when the terminal voltage Vc is higher than the first reference voltage Vref1, the first comparator signal Scm1 provided from the first comparator is the first invalid control signal Sn1. Therefore, the input terminal of the comparator is not marked with a positive sign or a negative sign, and the reason is that it is selected according to the actual circuit and the corresponding control method.

The switch unit 22 includes a path switch 222. The path switch 222 may be composed of, for example, but not limited to, components with switching functions, such as MOSFET transistors and electronic components, such as resistors, capacitors, etc. Take the transistor as an example, a first end of the path switch 222 is coupled to the bus positive terminal Bp, and a second end of the path switch 222 is coupled to the power terminal 1-1. A control end of the path switch 222 is coupled to the first control unit 24 and the second control unit 26, and the path switch 222 is turned on or turned off by signals provided from the first control unit 24 and the second control unit 26. When one of the first control unit 24 and the second control unit 26 provides a valid control signal, the path switch 222 is turned on; when both the first control unit 24 and the second control unit 26 provide invalid control signals, the path switch 222 is turned off.

As shown in FIG. 3B, the first control unit 24 may be a first switch circuit and the second control unit 26 may be a second switch circuit. The first switch circuit includes a first transistor SW1. A control end of the first transistor SW1 is coupled to the bus negative terminal Bn, a first end of the first transistor SW1 is coupled to the switch unit 22, and a second end of the first transistor SW1 is coupled to the first port 100-1. The first switch circuit is used to control the switch unit 22 by turning on or turning off the first transistor SW1 through the terminal voltage Vc. The first transistor SW1 is turned on and turned off according to the first valid control signal Se1 and the first invalid control signal Sn1. Similarly, the second switch circuit includes a second transistor SW2. A control end of the second transistor SW2 is coupled to the second pin Ec2, a first end of the second transistor SW2 is coupled to the switch unit 22, and a second end of the second transistor SW2 is coupled to the first port 100-1. The second switch circuit is used to control the switch unit 22 by turning on or turning off the second transistor SW2 through the second control signal Sc2. The second transistor SW2 is turned on and turned off according to the second valid control signal Se2 and the second invalid control signal Sn2.

In one embodiment, when the terminal voltage Vc of the bus negative terminal Bn increases, the first transistor SW1 is turned on so that the terminal potential of the first transistor SW1 is used as the first valid control signal Se1. On the contrary, the first transistor SW1 is turned off, and the terminal potential of the first transistor SW1 is used as the first invalid control signal Sn1. When the second control signal Sc2 is the high potential, the second transistor SW2 is turned on so that the terminal potential of the second transistor SW2 is used as the second valid control signal Se2. On the contrary, the second transistor SW2 is turned off, and the terminal potential of the second transistor SW2 is used as the second invalid control signal Sn2. In one embodiment, turning on and turning off the first transistor SW1 and the second transistor SW2 may be opposite to the above-mentioned embodiment. That is, when the terminal voltage Vc increases, the first transistor SW1 is turned off so that the terminal potential of the first transistor SW1 is used as the first valid control signal Se1, or when the terminal voltage Vc increases, the first transistor SW1 is turned on so that the terminal potential of the first transistor SW1 is used as the first invalid control signal Sn1.

The difference between the switch unit 22 shown in FIG. 3B and the switch unit 22 shown in FIG. 3A is that the switch unit 22 of the former further includes a drive switch 224. A first end of the drive switch 224 is coupled to the control end of the path switch 222, and a control end of the drive switch 224 is coupled to the first control unit 24 and the second control unit 26. The drive switch 224 is used to drive the path switch 222 turning on or turning off. Specifically, since the DC voltage Vdc received by the first port 100-1 may be a high voltage of 48 to 55 volts, the transistor of the path switch 222 needs to use p-MOSFET to withstand the DC voltage Vdc to avoid insufficient voltage withstand of the transistor (if a compliant n-MOSFET is used, the price will be too expensive). Therefore, the drive switch 224 is used to drive the path switch 222 so that the first port 100-1 and the power terminal 1-1 of the regulation energy storage module 12 can be successfully connected through the path switch 222. However, if the DC voltage Vdc is not high or the compliant n-MOSFET is suitable for use, the drive switch 224 may be omitted. Furthermore, if the DC voltage Vdc is above a specific voltage (for example, but not limited to, 30 volts), the path switch 222 and the drive switch 224 of FIG. 3B may preferably be used as the switch unit 22 to withstand the DC voltage Vdc. On the contrary, if the DC voltage Vdc is below the specific voltage, the single path switch 222 of FIG. 3A may preferably be used as the switch unit 22.

Figure 4:
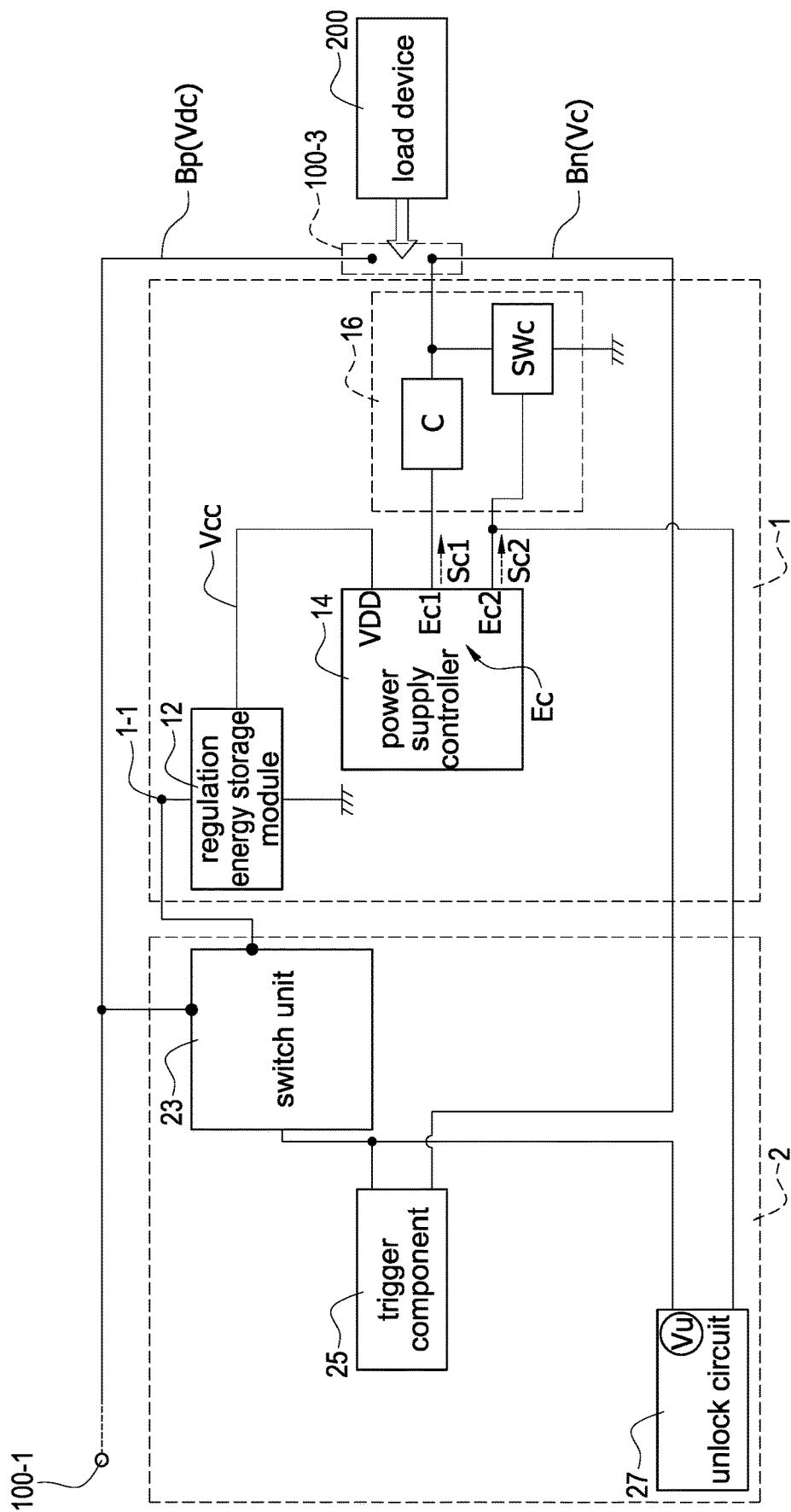
FIG. 4 is a detailed block diagram of the Ethernet power supply with the power saving function according to a second embodiment of the present disclosure.

Please refer to FIG. 4, which shows a detailed block diagram of the Ethernet power supply with the power saving function according to a second embodiment of the present disclosure, and also refer to FIG. 3B. The difference between FIG. 4 and FIG. 2 is that the second control module 2 of the former includes a switch unit 23, a trigger component 25, and an unlock circuit 27. A first end of the switch unit 23 is coupled to the power terminal 1-1, and a second end of the switch unit 23 is coupled to a bus positive terminal Bp. The trigger component 25 is coupled to the bus negative terminal Bn and the switch unit 23. The unlock circuit 27 is coupled to the second pin Ec2 of the communication terminal Ec and the switch unit 23. The switch unit 22 is used to connect the coupling relationship between the power terminal 1-1 and the bus positive terminal Bp by providing a lock-on state according to the load device 200 being connected (inserted) to the Ethernet power supply 100 so that the first control module 1 is powered on to work. The unlock circuit 27 is used to disconnect the coupling relationship between the power terminal 1-1 and the bus positive terminal Bp by providing an unlock-off state according to the load device 200 being disconnected (removed) from the Ethernet power supply 100 so that the first control module 1 is powered off to rest (stop working). The trigger component 25 triggers the switch unit 23 to be the lock-on state when the terminal voltage Vc of the bus negative terminal Bn is increased from a low potential to a specific potential. The unlock circuit 27 builds an unlock voltage Vu according to the potential of the second control signal Sc2 so that the unlock circuit 27 controls the switch unit 23 to be the unlock-off state through the unlock voltage Vu when the load device 200 is disconnected from the Ethernet power supply 100.

Specifically, when the load device 200 is not connected to (disconnected from) the Ethernet power supply 100, the trigger component 25 and the unlock circuit 27 disconnect the coupling relationship between the power terminal 1-1 and the bus positive terminal Bp so that the first control module 1 is powered off to rest and does not provide the first control signal Sc1. When the load device 200 is connected to the Ethernet power supply 100, a temporary loop is formed between the Ethernet power supply 100 and the load device 200 through the first port 100-1, the bus positive terminal Bp, the load device 200, and the bus negative terminal Bn so that a terminal voltage Vc of the bus negative terminal Bn is increased. Due the increase of the terminal voltage Vc of the bus negative terminal Bn, the switch unit 23 is triggered to be the lock-on state according to the temporary state of connecting the load device 200 to the Ethernet power supply 100 so that the power terminal 1-1 and the bus positive terminal Bp is electrically coupled (indicated by dashed lines). In this condition, since the power supply controller 14 is still powered off to rest, the communication terminal Ec has not outputted the second control signal Sc2 to the unlock circuit 27 so that the unlock circuit 27 has not yet built the unlock voltage Vu. When the power supply controller 14 receives the power supply voltage Vcc (or the DC voltage Vdc) to be powered on to work, the power supply controller 14 starts to provide the first control signal Sc1 to communicate with the load device 200, thereby determining whether the load device 200 is the valid (available) load.

When the power supply controller 14 is successfully communicated with the load device 200 through the first control signal Sc1 and confirms that the load device 200 is the valid load, it means that the communication between the power supply controller 14 and the load device 200 is completed, and therefore the power supply controller 14 ends (stops) providing the first control signal Sc1. In this condition, the power supply controller 14 provides, for example, but not limited to, a second control signal Sc2 with a first potential to the communication module 16 (where the first potential may be a high potential) to control the communication module 16 grounding the bus negative terminal Bn. When the bus negative terminal Bn is grounded, the DC voltage Vdc may be provided to the load device 200 through the bus positive terminal Bp and the bus negative terminal Bn to supply the power required by the load device 200. After the trigger component 25 triggers the switch unit 23 to be the lock-on state, since the switch unit 23 is locked, the switch unit 23 is still in the lock-on state even if the state of the trigger component 25 changes. The unlock circuit 27 builds the unlock voltage Vu according to the second control signal Sc2 with the first potential provided by the communication terminal Ec. When the power supply controller 14 is unsuccessfully communicated with the load device 200 through the first control signal Sc1 and determines that the load device 200 is the invalid (unavailable) load. The control method is similar to that disclosed in FIG. 2, and the detail description is omitted here for conciseness.

When the load device 200 is disconnected from the Ethernet power supply 100, the terminal voltage Vc of the bus negative terminal Bn will change to, for example, but not limited to, a high potential. The power supply controller 14 provides the second control signal Sc2 with the second potential (where the second potential may be a low potential) to the communication module 16 according to the terminal voltage Vc of the bus negative terminal Bn changing to the high potential. The second control signal Sc2 with the second potential controls the communication module 16 to restore the bus negative terminal Bn to a state of not being connected (inserted) to the load device 200. In this condition, the trigger component 25 still cannot trigger the switch unit 23 to change state. The unlock circuit 27 provides the unlock voltage Vu to the switch unit 23 according to the second control signal Sc2 with the second potential so that the switch unit 23 is controlled to be the unlock-off state through the unlock voltage Vu. In one embodiment, the coupling relationships and control methods of the circuit components that are not described in FIG. 4 may be the same as those in FIG. 2, and the detail description is omitted here for conciseness.

Figure 5A:
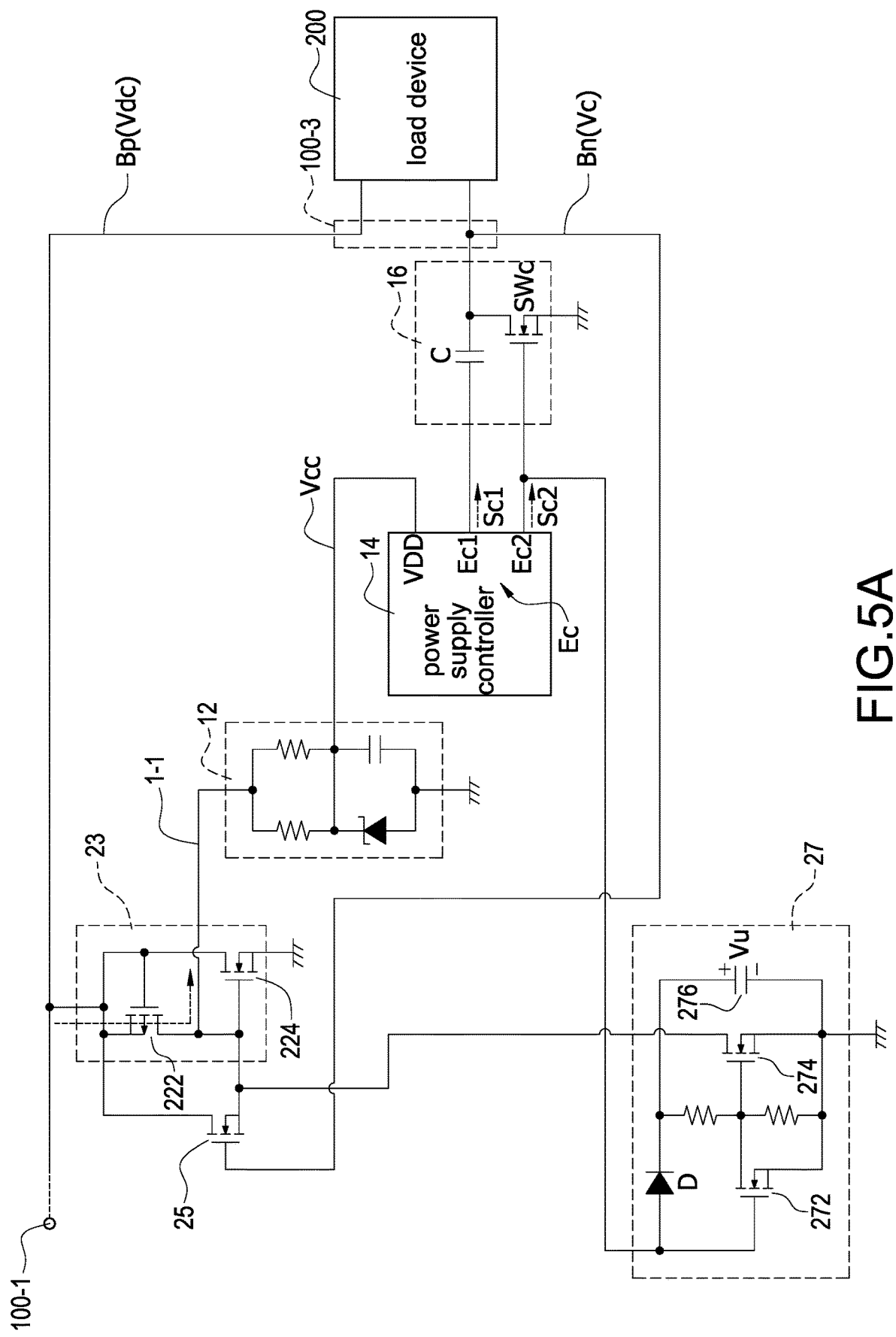
FIG. 5A is a block diagram of a first embodiment of the second control module of the Ethernet power supply according to the second embodiment of the present disclosure.
Figure 5B:
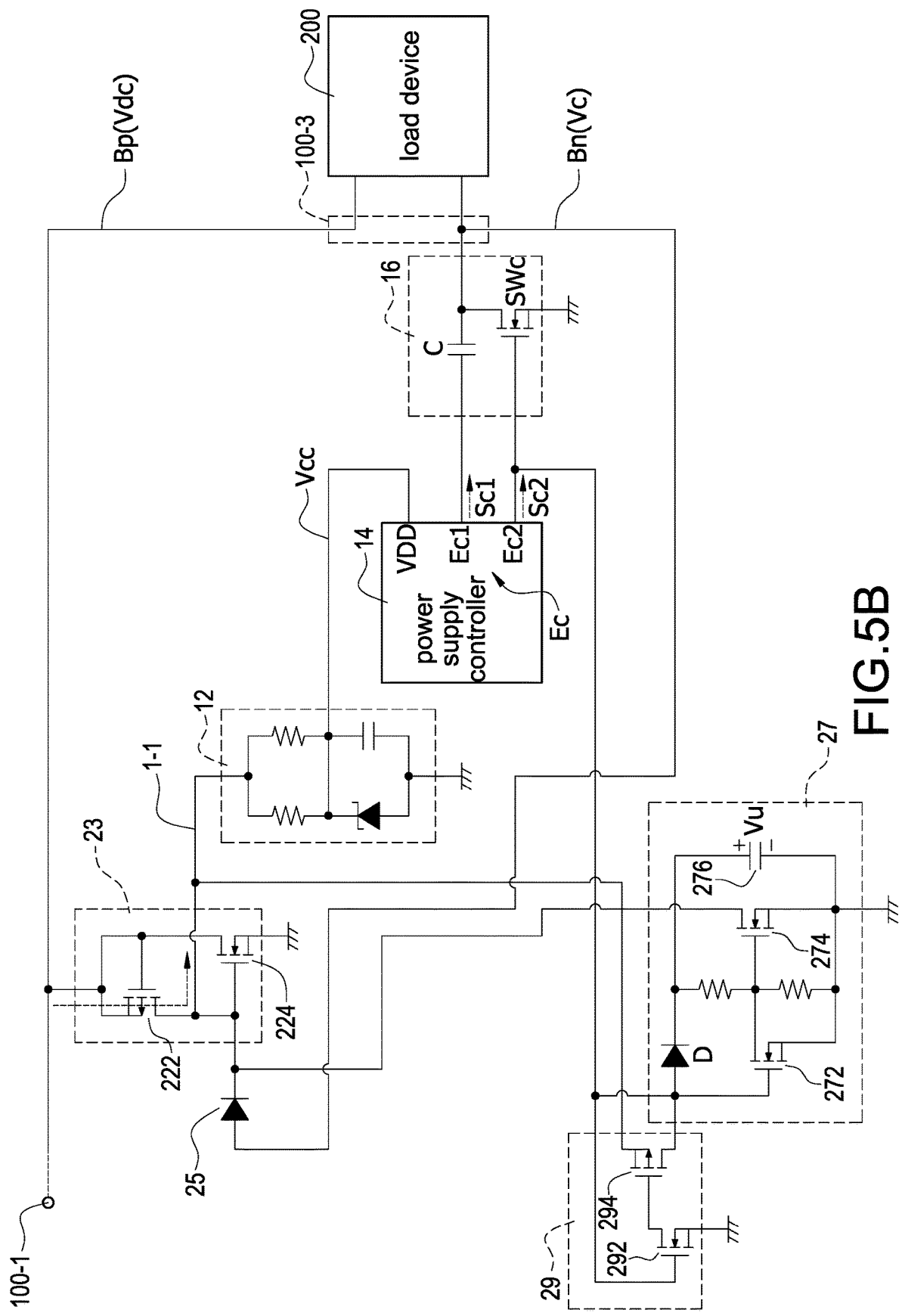
FIG. 5B is a block diagram of a second embodiment of the second control module of the Ethernet power supply according to the second embodiment of the present disclosure.

Please refer to FIG. 5A, which shows a block diagram of a first embodiment of the second control module of the Ethernet power supply according to the second embodiment of the present disclosure, FIG. 5B, which shows a block diagram of a second embodiment of the second control module of the Ethernet power supply according to the second embodiment of the present disclosure, and also refer to FIG. 1 and FIG. 2. In FIG. 5A, the trigger component 25 is a trigger switch. A first end of the trigger switch 25 is coupled to the bus positive terminal Bp, a second end of the trigger switch 25 is coupled to the switch unit 23 and the unlock circuit 27, and a control end of the trigger switch 25 is coupled to the bus negative terminal Bn. The trigger component 25 triggers the switch unit 23 to be the lock-on state when the terminal voltage Vc of the bus negative terminal Bn is increased from a low potential to a specific potential. After the switch unit 23 is in the lock-on state, the switch unit 23 cannot be triggered again no matter if the trigger switch is turned on or turned off (i.e., before the load device 200 is not removed (disconnected)).

The switch unit 23 is, for example, but not limited to, a double gate latch circuit, and the double gate latch circuit includes a path switch 222 and a drive switch 224. A first end of the path switch 222 is coupled to the bus positive terminal Bn, and a second end of the path switch 222 is coupled to the power terminal 1-1. A first end of the drive switch 224 is coupled to a control end of the path switch 222, and a control end of the drive switch 224 is coupled to the trigger component 25 and the unlock circuit 27. The drive switch 224 is used to lock on or unlock off the path switch 222 according to the terminal voltage Vc and the second control signal Sc2 so that the electrically coupling relationship (indicated by dashed lines) between the power terminal 1-1 and the bus positive terminal Bp is controlled. When the trigger component 25 is turned on due to the increase of the terminal voltage Vc, the drive switch 224 is turned on so as to lock on the path switch 222, thereby connecting the electrically coupling relationship between the power terminal 1-1 and the bus positive terminal Bp. When the unlock circuit 27 receives the second control signal Sc2 with the second potential, the unlock circuit 27 pulls low the potential of the control end of the drive switch 224 through the unlock voltage Vu so as to unlock off the path switch 222 by turning off the drive switch 224.

The unlock circuit 27 includes a first unlock switch 272, a second unlock switch 274, and an energy storage component 276. A control end of the first unlock switch 272 is coupled to the communication terminal Ec. A first end of the second unlock switch 274 is coupled to the trigger component 25 and the switch unit 23, and a control end of the second unlock switch 274 is coupled to a first end of the first unlock switch 272. The energy storage component 276 is, for example, but not limited to, a component with energy storage function, such as a capacitor, and the energy storage component 276 is coupled to the communication terminal Ec and the control end of the second unlock switch 274. When the communication between the power supply controller 14 and the load device 200 is completed and the second control signal Sc2 with the first potential is provided, the first unlock switch 272 is turned on through the second control signal Sc2 with the first potential so that the energy storage component 276 is charged to build the unlock voltage Vu. When the power supply controller 14 provides the second control signal Sc2 with the second potential due to the removal of the load device 200 from the Ethernet power supply 100, the first unlock switch 272 is turned off through the second control signal Sc2 with the second potential. In this condition, the unlock voltage Vu is provided to the control end of the second unlock switch 274 so that the second unlock switch 274 is turned on according to the unlock voltage Vu. When the second unlock switch 274 is turned on, the second unlock switch 274 pulls low the potential of the control end of the drive switch 224 so as to unlock off the path switch 222 by turning off the drive switch 224.

The unlock circuit 27 includes a diode D. An anode of the diode D is coupled to the second pin Ec2 of the communication terminal Ec and the control end of the first unlock switch 272, and a cathode of the diode D is coupled to the control end of the second unlock switch 274. The diode D is used to prevent the electricity generated from the unlock voltage Vu from flowing to a path other than the control end of the second unlock switch 274 when the unlock voltage Vu is released so as to avoid the risk of failure of the unlock circuit 27. In one embodiment, the above-mentioned circuit may not only be implemented by a circuit composed of transistors, resistors, and capacitors, but also a circuit composed of logic gates. Therefore, the above-mentioned implementation is only a simpler and relatively low-cost implementation, but it is not limited to only using the above-mentioned circuit structure to implement. Any circuit that can achieve the above-mentioned action, a controller with a control program, etc., should be embraced within the scope of the present disclosure.

The difference between the second control module 2 shown in FIG. 5B and the second control module 2 shown in FIG. 5A is that the trigger component 25 of the former is a unidirectional conduction (turned-on) component. A first end of the unidirectional conduction component is coupled to the bus negative terminal Bn, and a second end of the unidirectional conduction component is coupled to the switch unit 23 and the unlock circuit 27. The first end of the unidirectional conduction component is forward direction to the second end of the unidirectional conduction component. The unidirectional conduction component, for example, but not limited to, may be a diode or a thyristor. The unidirectional conduction component is used to trigger the switch unit 23 to be the lock-on state (to be forward-biased) when the terminal voltage Vc increases from a low potential to above a specific potential. After the switch unit 23 is controlled to be the lock-on state, the switch unit 23 cannot be triggered again no matter if the trigger switch is turned on or turned off (i.e., before the load device 200 is not removed (disconnected)).

The second control module 2 further includes a drive circuit 29. The drive circuit 29 is coupled to the power terminal 1-1, the second pin Ec2 of the communication terminal Ec, and the unlock circuit 27. The drive circuit 29 provides the DC voltage Vdc at the power terminal 1-1 to the unlock circuit 27 according to the second control signal Sc2 to drive the unlock circuit 27 to build the unlock voltage Vu. Since the power of the second control signal Sc2 provided by the second pin Ec2 of the first control module 1 is usually not high, it is difficult to drive the switch unit (i.e., the first unlock switch 272) and to charge the capacitor (i.e., the energy storage component 276) due to insufficient power. Therefore, the drive circuit 29 may be used to introduce the DC voltage Vdc to drive the unlock circuit 27 more easily. The drive circuit 29 may be, for example, but not limited to, a Darlington circuit composed of a first drive switch 292 and a second drive switch 294. The Darlington circuit and the second control signal Sc2 are used to introduce the DC voltage Vdc with a strong drive capability so that the unlock circuit 27 can be driven more easily.

In one embodiment, the embodiments of FIG. 3A and FIG. 3B can be applied alternately to each other, and the embodiments of FIG. 5A and FIG. 5B can be alternately applied to each other. FIG. 5A and FIG. 5B include more detailed implementations of the regulation energy storage module 12, which may be selected according to the actual requirements of the circuits. In one embodiment, compared to the second embodiment of FIG. 4, the first embodiment of FIG. 2 does not a latch function. In order to prevent the second control module 2 from unexpectedly turning off the switch unit 22 for a short time, causing the power supply controller 14 to be out of power and causing the Ethernet power supply 100 to fail between the load equipment 200 being connected to the Ethernet power supply 100 and the load equipment 200 being disconnected, the circuit of FIG. 2 with the regulation energy storage module 12 is a preferred embodiment, that is, the power required for the operation of the power supply controller 14 may still be maintained when the regulation energy storage module 12 is temporarily turned off. On the other hand, since the second embodiment of FIG. 4 has a lock function, no matter if the trigger switch is turned on or turned off (i.e., before the load device 200 is not removed (disconnected)) after the switch unit 23 is in the lock-on state, the switch unit 23 cannot be triggered again. Therefore, the circuit of FIG. 4 does not need to be equipped with the regulation energy storage module 12.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An Ethernet power supply configured to receive a DC voltage, and coupled to a load device, the Ethernet power supply comprising:
   a first control module, configured to receive the DC voltage through a bus positive terminal and a bus negative terminal, and coupled to a negative end of the load device through the bus negative terminal so as to provide a first control signal through the bus negative terminal to confirm whether the load device is a valid load, and a second control signal is provided from a communication terminal to ground the bus negative terminal after the load device is confirmed as the valid load, and
   a second control module, coupled to a power terminal of the first control module and the bus positive terminal, and the second control module comprising:
   a switch unit, coupled to the bus positive terminal and the power terminal, and configured to connect or disconnect a coupling relationship between the power terminal and the bus positive terminal according to the load device being connected or not,
   a first control unit, coupled to the bus negative terminal and the switch unit, and configured to turn on or turn off the switch unit according to a terminal voltage of the bus negative terminal, and
   a second control unit, coupled to the communication terminal and the switch unit, and configured to turn on or turn off the switch unit according to the second control signal.

2. The Ethernet power supply as claimed in claim 1, wherein the first control unit is a first comparator; a first end of the first comparator is coupled to the bus negative terminal, a second end of the first comparator is coupled to a first reference voltage, and an output end of the first comparator is coupled to the switch unit; the first comparator is configured to compare the terminal voltage with the first reference voltage to provide a first comparison signal from the output end to control the switch unit.

3. The Ethernet power supply as claimed in claim 1, wherein the first control unit is a first switch circuit comprising a first transistor; a control end of the first transistor is coupled to the bus negative terminal, and a first end of the first transistor is coupled to the switch unit; the first switch circuit is configured to turn on or turn off the first transistor according to the terminal voltage to control the switch unit.

4. The Ethernet power supply as claimed in claim 1, wherein the second control unit is a second comparator; a first end of the second comparator is coupled to the communication terminal, a second end of the second comparator is coupled to a second reference voltage, and an output end of the second comparator is coupled to the switch unit; the second comparator is configured to compare the second control signal with the second reference voltage to provide a second comparison signal to control the switch unit.

5. The Ethernet power supply as claimed in claim 1, wherein the second control unit is a second switch circuit comprising a second transistor; a control end of the second transistor is coupled to the communication terminal, and a first end of the second transistor is coupled to the switch unit; the second switch circuit is configured to turn on or turn off the second transistor according to the second control signal to control the switch unit.

6. The Ethernet power supply as claimed in claim 1, wherein the switch unit comprises:
   a path switch, a first end of the path switch coupled to the bus positive terminal, a second end of the path switch coupled to the power terminal, and a control end of the path switch coupled to the first control unit and the second control unit,
   wherein the first control unit and the second control unit are configured to turn on or turn off the path switch by controlling the control end of the path switch.

7. The Ethernet power supply as claimed in claim 6, wherein the switch unit further comprises:
   a drive switch, a first end of the drive switch coupled to the control end of the path switch, and a control end of the drive switch coupled to the first control unit and the second control unit,
   wherein the first control unit and the second control unit are configured to control the drive switch to turn on or turn off the path switch by controlling the control end of the drive switch.

8. An Ethernet power supply configured to receive a DC voltage, and coupled to a load device, the Ethernet power supply comprising:
- a first control module, configured to receive the DC voltage through a bus positive terminal and a bus negative terminal, and coupled to a negative end of the load device through the bus negative terminal so as to provide a first control signal through the bus negative terminal to confirm whether the load device is a valid load, and a second control signal is provided from a communication terminal to ground the bus negative terminal after the load device is confirmed as the valid load, and
- a second control module, coupled to a power terminal of the first control module and the bus positive terminal, and the second control module comprising:
- a switch unit, coupled to the bus positive terminal and the power terminal, and configured to provide a lock-on state to connect a coupling relationship between the power terminal and the bus positive terminal according to the load device being connected, and provide an unlock-off state to disconnect the coupling relationship between the bus positive terminal and the power terminal according to the load device being disconnected,
- a trigger component, coupled to the bus negative terminal and the switch unit, and configured to trigger the switch unit to be the lock-on state according to the increase of a terminal voltage of the bus negative terminal, and
- an unlock circuit, coupled to the communication terminal and the switch unit, and configured to build an unlock voltage according to the second control signal, and control the switch unit to be the unlock-off state through the unlock voltage when the negative end of the load device is disconnected from the bus negative terminal.

9. The Ethernet power supply as claimed in claim 8, wherein the trigger component is a trigger switch; a first end of the trigger switch is coupled to the bus positive terminal, a second end of the trigger switch is coupled to the switch unit and the unlock circuit, and a control end of the trigger switch is coupled to the bus negative terminal.

10. The Ethernet power supply as claimed in claim 8, wherein the trigger component is a unidirectional conduction component; a first end of the unidirectional conduction component is coupled to the bus negative terminal, and a second end of the unidirectional conduction component is coupled to the switch unit and the unlock circuit; the first end of the unidirectional conduction component is forward direction to the second end of the unidirectional conduction component.

11. The Ethernet power supply as claimed in claim 8, wherein the unlock circuit comprises:
- a first unlock switch, a control end of the first unlock switch coupled to the communication terminal,
- a second unlock switch, a first end of the second unlock switch coupled to the trigger component and the switch unit, and a control end of the second unlock switch coupled to a first end of the first unlock switch, and
- an energy storage component, coupled to the communication terminal and the control end of the second unlock switch,
- wherein the first unlock switch is turned on when the second control signal is a first potential so that the energy storage component is charged to build the unlock voltage; the first unlock switch is turned off when the second control signal is a second potential; the second unlock switch is turned on by the unlock voltage so that the switch unit is controlled to be the unlock-off state.

12. The Ethernet power supply as claimed in claim 11, wherein the unlock circuit further comprises:
- a diode, a first end of the diode coupled to the communication terminal and the control end of the first unlock switch, and a second end of the diode coupled to the energy storage component.

13. The Ethernet power supply as claimed in claim 8, wherein the switch unit comprises:
- a path switch, a first end of the path switch coupled to the bus positive terminal, and a second end of the path switch coupled to the power terminal, and
- a drive switch, a first end of the drive switch coupled to a control end of the path switch, and a control end of the drive switch coupled to the trigger component and the unlock circuit,
- wherein the unlock circuit is configured to unlock off the path switch by controlling the control end of the drive switch, and the trigger component is configured to lock on the path switch by controlling the control end of the drive switch.

14. The Ethernet power supply as claimed in claim 8, wherein the second control module further comprises:
- a drive circuit, coupled to the power terminal, the communication terminal, and the unlock circuit, and configured to drive the unlock circuit to build the unlock voltage when the second control signal provides the DC voltage to the unlock circuit.

* * * * *